(12) United States Patent
Augusto Di Grandi Nery et al.

(10) Patent No.: US 10,020,848 B2
(45) Date of Patent: Jul. 10, 2018

(54) METHOD FOR COMMUNICATION BETWEEN ELECTRONIC DEVICES THROUGH INTERACTION OF USERS WITH OBJECTS

(71) Applicant: SAMSUNG ELETRÔNICA DA AMAZÔNIA LTDA., Campinas (BR)

(72) Inventors: Marcelo Augusto Di Grandi Nery, Campinas (BR); Gustavo Kaneblai Martins Costa, Campinas (BR); Alexandre Barbosa Silveira, Campinas (BR); Rodrigo Jose Tobias, Campinas (BR); Renata Zilse Pereira Borges, Campinas (BR); Viviane Ortiz Franco, Campinas (BR); Paulo Victor Motta, Campinas (BR); Marcos Augusto De Goes, Campinas (BR); Leandro Dos Santos, Campinas (BR); Juliano Rodriguez Brianeze, Campinas (BR)

(73) Assignee: SAMSUNG ELETRÔNICA DA AMAZÔNIA LTDA., Campinas-São Paulo (BR)

(*) Notice: Subject to any disclaimer, the term of this patent is extended or adjusted under 35 U.S.C. 154(b) by 0 days.

(21) Appl. No.: 15/167,229

(22) Filed: May 27, 2016

(65) Prior Publication Data
US 2016/0373165 A1    Dec. 22, 2016

(30) Foreign Application Priority Data

Jun. 17, 2015 (BR) .......................... 102015014422

(51) Int. Cl.
*H04B 7/00* (2006.01)
*H04B 5/00* (2006.01)
(Continued)

(52) U.S. Cl.
CPC ............ *H04B 5/0031* (2013.01); *H04W 4/80* (2018.02); *H04W 76/14* (2018.02)

(58) Field of Classification Search
CPC ... H04B 5/0031; H04W 4/008; H04W 76/023
(Continued)

(56) References Cited

U.S. PATENT DOCUMENTS

| 8,554,250 B2* | 10/2013 | Linaker .............. G06K 9/00979 345/173 |
| 2009/0191531 A1 | 7/2009 | Saccocci et al. |

(Continued)

FOREIGN PATENT DOCUMENTS

| WO | 2013/001141 | 1/2013 |
| WO | 2014/016609 | 1/2014 |

(Continued)

*Primary Examiner* — Md Talukder

(57) ABSTRACT

The method of the present invention refers to digital link. The method (101) identifies the user interaction (103) with a specific object (100). According to this interaction, the method (101) identifies characteristics or data on the specific object (100) which allow the method (101) to extract personal information and associate it with an output message (for example, a predefined text, audio message to be recorded, etc.) that will be sent to the target contact/user (102) (which can be another person, a group of people, a system/service, or objects in general). Since the contact target (102) is identified, a smart device associated with the method (101) triggers a preset action for the connection with the contact target (102). The method (101) allows the reception of target responses contact (102) enabling the user (103) to maintain communication with the target user (102).

11 Claims, 4 Drawing Sheets

(51) Int. Cl.
*H04W 4/80* (2018.01)
*H04W 76/14* (2018.01)

(58) Field of Classification Search
USPC ..................... 455/41.1, 41.2, 41.3
See application file for complete search history.

(56) References Cited

U.S. PATENT DOCUMENTS

| | | | |
|---|---|---|---|
| 2009/0231099 A1* | 9/2009 | Hyde ................. | A01G 7/00 340/10.1 |
| 2012/0171956 A1* | 7/2012 | Lee .................. | G08B 21/24 455/41.2 |
| 2012/0190455 A1* | 7/2012 | Briggs .............. | H04L 67/38 463/42 |
| 2013/0059284 A1* | 3/2013 | Giedgowd, Jr. ...... | G09B 5/06 434/365 |
| 2013/0182898 A1* | 7/2013 | Maeda .............. | G06K 9/00228 382/103 |
| 2013/0207778 A1 | 8/2013 | Neafsey et al. | |
| 2013/0225078 A1* | 8/2013 | Johansson .......... | H04W 76/10 455/41.2 |
| 2014/0113549 A1* | 4/2014 | Beg ................. | H04W 4/12 455/41.1 |
| 2014/0227976 A1* | 8/2014 | Callaghan .......... | G06F 8/65 455/41.2 |
| 2014/0245140 A1* | 8/2014 | Brown .............. | G06Q 10/06 715/708 |
| 2014/0304381 A1* | 10/2014 | Savolainen ......... | H04L 41/0806 709/222 |
| 2015/0012840 A1* | 1/2015 | Maldari ............ | H04L 65/60 715/748 |
| 2015/0026296 A1* | 1/2015 | Halpern ............ | H04L 67/06 709/217 |
| 2016/0057565 A1* | 2/2016 | Gold ............... | H04W 4/008 455/41.1 |
| 2016/0150350 A1* | 5/2016 | Ingale ............. | H04W 4/70 370/255 |
| 2016/0323457 A1* | 11/2016 | Isomaki ............ | H04W 88/04 |
| 2016/0373165 A1* | 12/2016 | Augusto Di Grandi Nery ............... | H04B 5/0031 |

FOREIGN PATENT DOCUMENTS

| | | | |
|---|---|---|---|
| WO | 2014/109710 | 7/2014 | |
| WO | WO 2016050572 A1 * | 4/2016 | ............. G08C 17/02 |

* cited by examiner

METHOD FOR COMMUNICATION BETWEEN ELECTRONIC DEVICES THROUGH INTERACTION OF USERS WITH OBJECTS

CROSS-REFERENCE TO RELATED APPLICATIONS

This application is a U.S. Utility Application, which claims the foreign priority benefit under 35 U.S.C. § 119 of Brazilian Patent Application No. 10 2015 014422 9, filed Jun. 17, 2015, the contents of which are incorporated herein by reference.

FIELD OF THE INVENTION

The present invention refers to a method that allows interactions with an object triggers a voice or data connection between the person holding the object and a specific contact. More specifically, the method of the present invention provides a novel approach for Internet of Things (IoT), where the objects (things) and how they are handled might be analyzed and recognized as an intention to start a real voice or data communication with the person or group the manipulated object is associated with.

BACKGROUND OF THE INVENTION

The user's interaction with smart devices has exponentially increased along the years. The use of the Internet few years ago were just done by computers, but now the trend is all devices becoming "smart" with the interaction of the users and things (devices, smart devices, services, etc.) over the internet, more known as IoT or "Internet of Things" (i.e., an interconnection of uniquely identifiable embedded computing devices within the existing internet infrastructure).

Nowadays, the communication between people or groups is done specially by smart devices (in this case, smartphones). Normally, there is a contact list on the smart devices where each contact is equal, without any distinction of people (despite it might be possible to create groups of contacts—e.g.: "family", "friends", "work", etc.—there is not a way to differentiate contacts by affection level, intimacy, familiarity, and so on). Additionally, there are objects around the life of people that express feelings by loved person, or make them remember a special moment, such as a portrait with picture, a special gift, etc. It is a fact that the feelings are different referring to each individual. Having that in mind, there is a big opportunity and motivation to the present invention: "Why not connect beloved people through special objects that transmit to the user a certain kind of unique and distinct feeling?"

An object (such as a portrait or a special gift) can provide important information about people or system, and this information can provide to the user an automatic connection through the behavior of the users with these objects.

Patent document WO 2014016609 A1 titled "Jewellery with Tag", published on Jan. 30, 2014, describes an invention that relates to a piece of jewellery, wherein the jewellery comprises at least one tag or chip programmed with at least an unique identification code, and a tag reader is configured to read the tag or chip when the tag reader and the piece of jewellery are in touch, or come into close contact and, to display a message or content associated with the unique identification code.

The patent document WO 2014016609 A1 is related to jewellery, which contains a tag with information and an identification code. Since there is a tag reader, in this case RFID or NFC, the reader (that contains a display) shows the message stored in the tag. The present invention differs from document WO 2014016609 A1, since the act of reading the jewellery tag without the user interaction does not trigger a communication with others users.

Patent document WO 2013001141 A1 titled "Method and Apparatus for Sensory Tags Providing Sound, Smell and Haptic Feedback", published on Jan. 3, 2013, describes systems and methods for creating "feelings" from tangible objects in a responsive and cost efficient manner. In accordance with such systems and methods, near field communication (NFC) tags are embedded into tangible objects, e.g., compact discs (CDs), books, posters, etc., where the NFC tags include feeling/sensory feedback parameters associated with the object in which the NFC tag is embedded. That is, such NFC tags are able to stimulate one or more senses, such as the human senses of sight, hearing, touch, smell and taste. Thus, sensory feedback is provided via tangible objects, where only minimal cost (e.g., a few cents) is added to the production/manufacture of such objects.

Patent document WO 2013001141 A1 is related to the feedback of the user feels through a tag attached in objects. The type of these feedbacks are haptics feedbacks where the user feels feedbacks of sound, smell, vibrations and others human senses. In this case, this recognition of the input for the feedback is done by NFC proximity. The present invention differs from document WO 2013001141 A1 since it is not used to (automatically) start a communication with users, but only to transmit haptics feedbacks through a tag reader, via NFC recognition.

Patent document WO 2014109710 A1 titled "A Distributed Wireless Sensing System", published on Jul. 17, 2014, describes a device comprising: at least one input sensor, at least one output transducer, a wireless communication module and a processor configured to receive a local control parameter from the input sensor or a remote control parameter from a remote module communicating with the processor via the wireless communication module, and selecting one of a plurality of operational configurations depending on the local and remote control parameters, each of the plurality of operational configurations including a predetermined threshold for a sensing parameter received from the input sensor, and an output response if the sensing parameter breaches the threshold.

The purpose of the solution present in document WO 2014109710 A1 is different from the method of the present invention. In the document WO 2014109710 context, when the device is shaken or pressed, it is trigged to detect and monitor objects. This monitoring includes sounds, positions, etc. Therefore, the matter of document WO 2014109710 A1 is completely different from the method of the present invention, which the main goal is to trigger (automatic) communication between a first user and a target user or device, once the said first user interacts with a specific object that implements the method of the present invention.

Patent document US 20090191531 A1 titled "Method and Apparatus for Integrating Audio and/or Video With a Book", published on Jul. 30, 2009, describes a method and apparatus for synchronization of sensory stimulation with the reading experience. In a specific embodiment, audio and/or video stimulation can be provided to a reader. In additional embodiments, the sensory stimulation can include touch, smell and/or taste. The reading experience can include, for example, the reading of books, magazines, textbooks, telephone directories, maps, resumes, brochures, newspapers or other forms of written or printed materials, which can include, but are not limited to, words, photographs, illustrations, drawings, cartoons and Braille. The synchronization of sensory stimulation with the reading experience can involve providing sensory stimulation in relation to a reader's location or approximate location with respect to written or printed materials. In addition to sensory stimulation, other forms of interaction can be provided, such as interactive games, or interactive tests. A specific embodiment relates to a method and apparatus for synchronizing audio and/or video to a book as it is read.

Document US 2009191531 A1 is related with the experience of the user on the act of reading a page book. Through a tag, in this case NFC tag, there is a stimulation of the user when the page is read, transmitting feelings, smells, sound, etc. A device reads the tag. This solution brings to the user stimulus of reading with possible real sensation. The present invention differs from this document since in this document US 2009191531 there is no recognition and communication between users triggered by interaction of users with objects, as it occurs in the present invention.

Patent document US 20130207778 A1 titled: "Accessory for a Mobile Device", published on Aug. 15, 2013, describes a mobile device, which includes an accessory. The accessory may include two communication modules. The accessory is configured to receive data from the mobile device wirelessly. The accessory is configured to store the data. The accessory is configured to transmit at least a portion of the data to a reader device.

The method of document US 20130207778 proposes an accessory coupled to a mobile phone that communicates via Bluetooth. The accessory is able to read information from NFC tag and since established the connection via Bluetooth with the mobile phone, this information is transferred. This concept of communication differs from the proposed method of the present invention, because there is no interaction of the user with an object to be recognized. Additionally, the solution of document US 20130207778 A1 requires an accessory coupled to a mobile phone, but in the present invention, it is not necessary the use of an accessory coupled to the mobile phone.

Nowadays, there are products that allow the extraction of information through an object (e.g. a near field communication (NFC) tag), which is read by smartphones to start a communication between users or things. However, none of these products can provide a connection through the interaction of users with objects (e.g., a touch, a gesture, an approaching device, and so on), wherein this interaction might be identified (e.g., by a special wearable device, by image recognition with cameras installed in a room) and then, once identified, this interaction starts a digital communication without the necessity of the user handling the smartphone (or another similar smart device).

SUMMARY OF THE INVENTION

The present invention refers to a method to start a digital connection through interactions with objects. In order to start the communication process, the method detects a specific interaction of users with a specific object. Once detected the interaction of users with object, the method identifies characteristics and data of the object, which enable to extract information of contacts and associate it to an output message (e.g., a predefined text, an audio message to be recorded, etc.) which will be transmitted to the target contact/user. The method which contemplates a smart device, receives the interaction identified with information and characteristics/data necessary for identification of a contact. Since a contact is identified, the smart device or the object itself automatically triggers a predefined action, connecting the user to the recipient's contact represented by the object.

More specifically, the present invention relates to a method for starting a communication between electronic devices through user interaction with objects, said method comprising the steps of:
 detecting a user interaction with specific object;
 identifying associated data, contact information and characteristics of the specific object;
 presenting a plurality of actions/messages suggested to the user to decide/choose as user interaction with the specific purpose;
 checking whether the object has communication resource, where:
  if so, the object automatically communicates with the smart device of the target contact;
  if not, pairs and transmits/sends the message/action chosen for the smart device of the user, and smart device of the user automatically communicates with the smart device of the target contact; and
 checking whether there is a response from the target contact.

The present method will provide to the user an "automatic" connection with person, group of people and system, through interaction with specific objects (e.g., portraits, toys and gifts). The method of the present invention transforms objects with emotional connections into real connections. Since there are objects around the life of people that express feelings by loved person, or make them remember a special moment with a person (such as a portrait with picture, a special gift, etc.), why not to connect beloved people through special objects that transmit to the user a certain kind of unique, distinct feeling?

BRIEF DESCRIPTION OF DRAWINGS

The objectives and advantages of the present invention will become clearer from the detailed description below of a preferred embodiment, but not limiting the invention in view of the accompanying drawings, wherein.

DETAILED DESCRIPTION OF THE INVENTION

The main objective of the present invention is provide the user with a method to start a digital connection through interaction of the users with objects. It is not the scope of the present invention to create a new protocol or propose a short-range communication (information sharing) standard, since the proposed method, as described in the present invention, should work with existing protocols or commonly used short-range communication standards. One person skilled in the art might recognize there are many possibilities of pre-programming the objects/accessories with associated contact information detailing how the contact information are inserted into the accessory or what is the protocol of communication between the devices. Having that in mind, the following explanation is provided which must be read together with the attached drawings.

Figure 1:
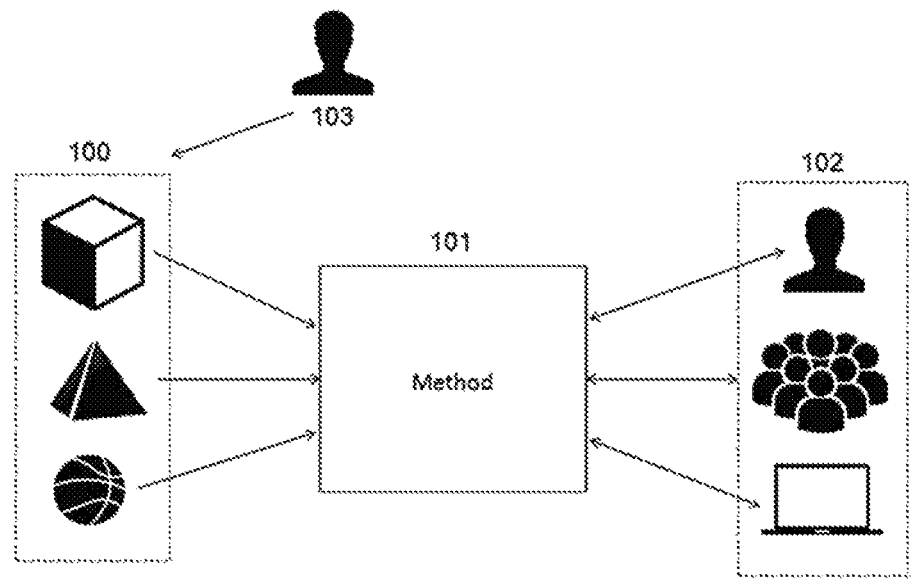
FIG. 1 shows an overview of the method of the present invention.

FIG. 1 illustrates a general overview of the method of the present invention that is proposed for digital connection. The method 101 identifies the interaction of the user 103 with a specific object 100. According to this interaction, the method 101 identifies characteristics or data in the specific object 100 which allow the method 101 to extract contact information and associate it to an output message (e.g.: a predefined text, an audio message to be recorded, etc.) which will be transmitted to the contact target/user 102 (which can be another person, a groups of people, a system/service, or things in general). Since identified the target contact 102, a smart device associated with the method 101 triggers a predefined action for connection to the target contact 102. The method 101 allows receiving feedbacks from target contact 102, allowing the user 103 to keep the communication with target contact 102.

Figure 2:
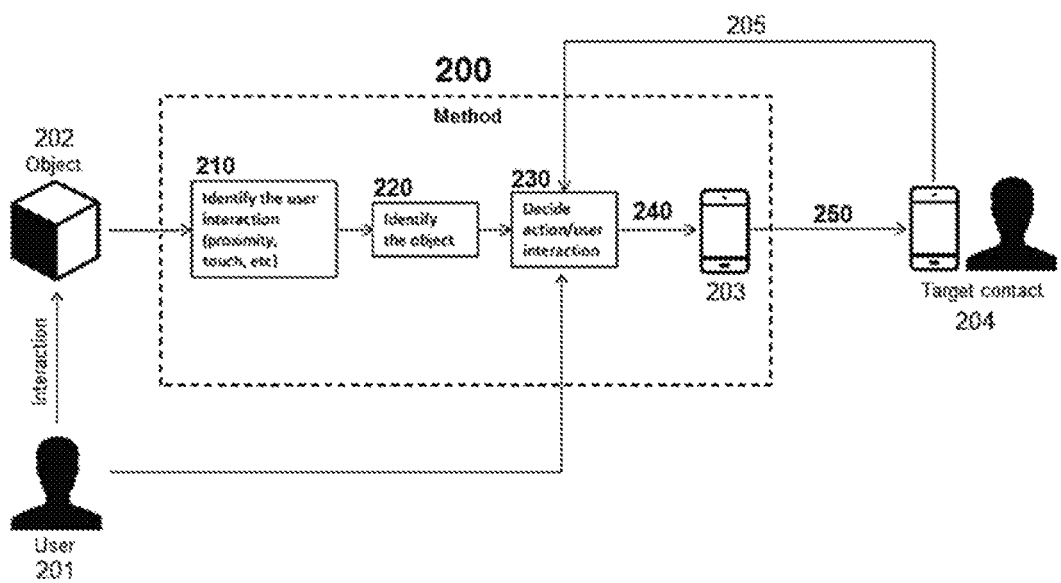
FIG. 2 shows a detailed view of the method of the present invention.

FIG. 2 illustrates a more detailed view of the method of the present invention. The object 202 contains contact information and/or characteristics data stored therein, through e.g., a smart label, bar code, information of images, etc. The user 201 interacts with the object 202 e.g., taking in the hands, bringing it near to the body, touching it, etc. The proposed method 200 identifies the interaction 210 of the user 201 with the object 202, in which this identification can be done e.g., by NFC reader in the case of the object 202 containing a smart tag, image recognition through a camera, bar code reader, infrared, electro vibration, etc., that allow the method 200 to extract characteristics/data and contact information. Once identified the user interaction 210 and the object information 220, the user 201 is able to decide what action/interaction to take 230 (it could be the recording of an audio message to be sent, for example). With the decision of the user 201, an automatic connection 240 is established between the specific object 202 and the smart device of the user 203 (e.g. via Bluetooth, Bluetooth low energy, Wi-Fi, infrared, NFC and others), without necessity of the user 201 to handle his/her smart device 203. When the smart device 203 of the user receives the information of contact and/or characteristics/data from the user interaction (steps 210, 220 and 230), the smart device 203 identifies a target contact 204 and triggers/executes 250 the predetermined action (as decided in step 230). If the target contact 204 somehow replies, the method 200 receives the feedback 205 and, with the decision of the user interaction 230, can reply (execute another) action 250 to the target contact 204.

Figure 3:
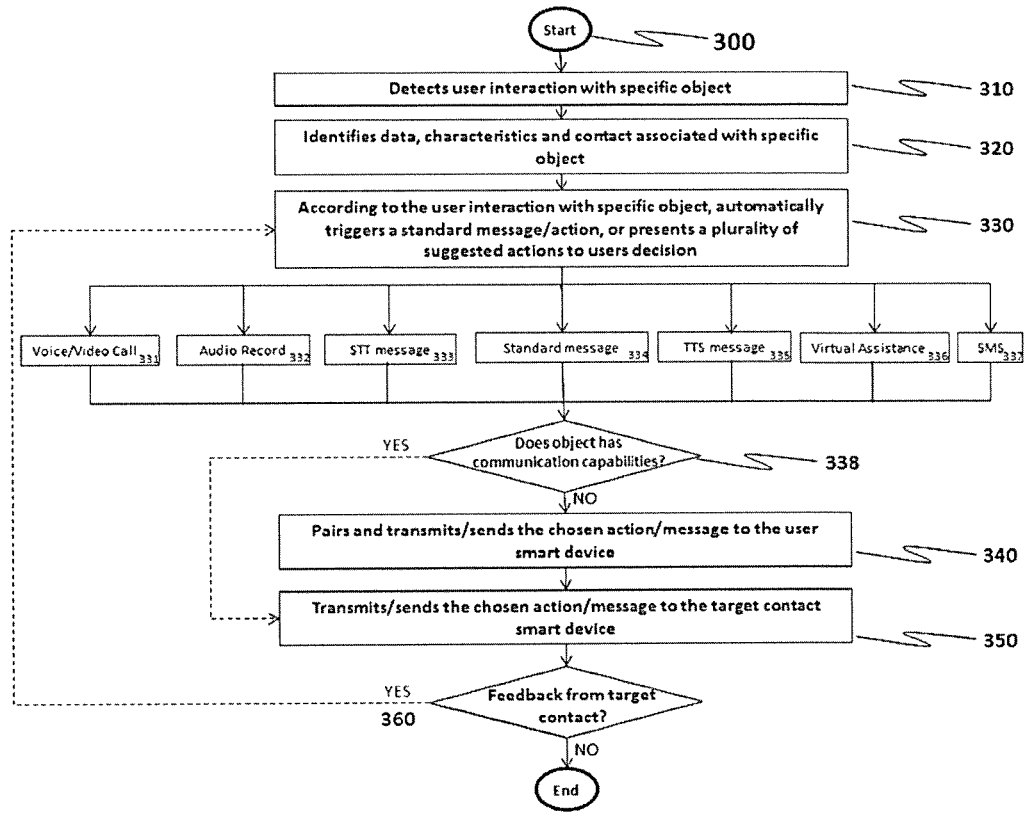
FIG. 3 shows a flowchart with the steps of the method of the present invention.

FIG. 3 shows a flowchart of the proposed method 300, disclosing all detailed steps for the invention. Firstly, the method 300 detects an user interaction with specific object (step 310). The user interaction can be a touch, a gesture, take the object and bring it near to the body, etc. This interaction can be detected by different manners, e.g., a wearable device that the user is wearing, a reader of NFC smart tags, bar code, infrared, Bluetooth, a camera allowing image recognition, electro vibration, ultrasonic vibration, etc.

It is a prerequisite of the proposed method 300 that every specific object (which is subject to user interaction) contains associated data (e.g. a preset/default message), target contacts information (e.g.: contact phone number) and characteristics (e.g., for a determined kind of user interaction, there can be preset/default actions to be automatically triggered or there may be a plurality of suggested actions that requests user decision). Since the specific object contains associated data, contact information and characteristics, when the user interaction with this specific object is detected (step 310), all associated data, contact information and characteristics are identified (step 320).

This information is processed and, according to the previous detected user interaction with specific object, the method 300 presents a plurality of suggested actions that requests user decision, or, alternatively, it can automatically triggers a standard/preset action/message to the target contact (step 330). These actions/messages include: voice/video calls 331, audio record 332, speech to text (STT) 333, standard/default messages 334, text to speech (TTS) 335, virtual assistance 336, SMS 337, etc.

Then, the proposed method 300 verifies if the object has communications capabilities, e.g., Wi-Fi (step 338). If the object has communication capabilities, the method 300 skips to step 350 wherein the object automatically communicates with the smart device of the target contact (i.e., it does not use the smart device as an intermediate, according to step 340). Otherwise, if the object has no communication capabilities, the method 300 pairs (establishes connection) and transmits/sends the chosen action/message to the user smart device (step 340). The user smart device automatically communicates with the smart device of the target contact (step 350) according to the contact already identified by the interaction of the user with the specific object (step 320). The target contact may be another user, a group of users, a web service, a computer system, etc.

Eventually, the target contact may use his/her smart device to reply the message, providing a feedback to the source user. If there is no feedback, the communication among them is over. If there is a kind of feedback (step 360), the user smart device receives these information through the communication channel already established, enabling the user to choose another action/message (returns to step 330), keeping the communication. For a better understanding of the proposed method (300), an illustration of its usage/operation is presented, according to FIGS. 4 and 6, which are (non-limitative) examples of possible embodiments of the present invention.

Figure 4:
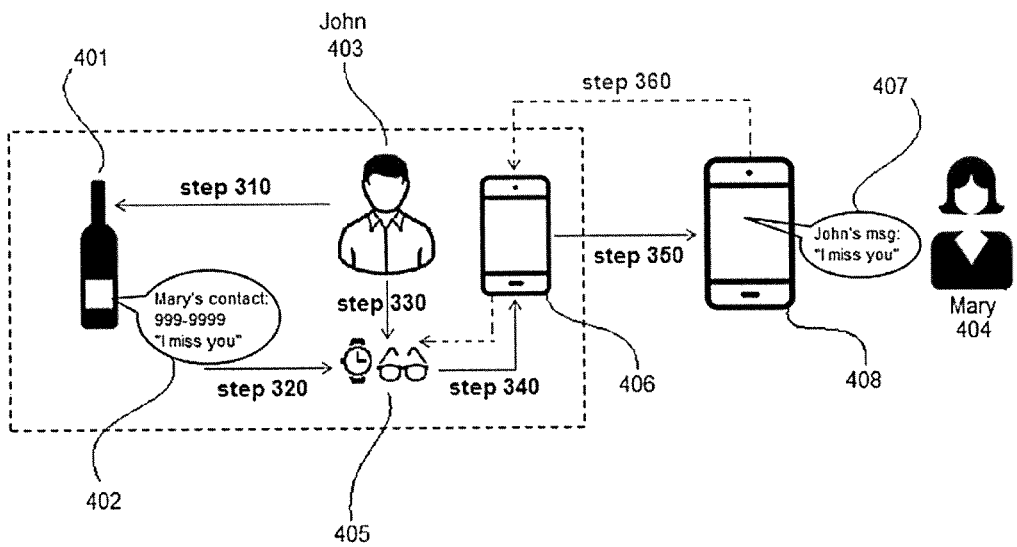
FIG. 4 illustrates an embodiment of the method of the present invention using a wearable device.

FIG. 4 shows an embodiment with a wearable device. In this example, the proposed type of interaction is the approximation of an object that contains information (e.g., a NFC tag, a bar code, etc.) to the user smart device (e.g., a smart watch, a smart glass with camera to identify the object, a "smart necklace" with NFC reader, etc.). In the context of the present example, the object 401 can be a gift that John 403 received from Mary 404. The object 401 contains a NFC tag pre-programmed with a message and a determined contact 402 (in the present example, the determined contact could be Mary's phone number and the pre-programmed message could be "I miss you"). The process of communication starts when the user (John) 403 handles the object 401 and interacts with it, for example bringing it near to a wearable device 405 [corresponds to step 310 of the proposed method]. This interaction (approximation) is recognized by the wearable device 405 [corresponds to step 320 of the proposed method], which contains a NFC reader and converter. The object information 402 is identified and processed by the wearable device 405, allowing the user to choose a communication to be established with the identified contact (Mary 404), e.g., an audio record, STT, TTS, voice/ video call, standard message already identified or others [corresponds to step 330 of the proposed method]. Since the communication is defined/chosen by the user (John) 403, the wearable device 405 is paired with the user (John 403) smart device 406 [corresponds to step 340 of the proposed method]. Automatically (i.e., without the necessity of user 403 handling his smartphone 406), the user smartphone 406 sends a standard message to the target contact (Mary) 404 [corresponds to step 350 of the proposed method] (note that both the standard message and the target contact were identified/detected 402 according to the interaction of the user 403 with the object 401—step 320). The target contact (Mary) 404 receives the message 407 via her smart device 408. If the target contact (Mary) 404 replies the communication [corresponds to step 360 of the proposed method], smart device 406 of the first user (John) will receive the feedback, and it could alternatively forward the message/feedback to the (John's) wearable device 405. The wearable device 405 has resources of vibration, speaker, microphone, LED light to alert/inform the user (John) 403 about the feedback receipt. The dashed line area represents the "main scope of operation" (steps 310 to 350) of the proposed method 300.

In the context of the present example (FIG. 4), said wearable device 405 contains at least: a battery; a processor; a wireless communication system (e.g., NFC, Bluetooth, Wi-Fi, Zigbee, etc.), a means to detect/identify the interaction of the user with the object (e.g., NFC reader, camera, accelerometer, gyroscope, other sensors, etc.), and a memory to store a software, which is executed by the said processor to detect/identify the interaction of user with object, extract the associated object-contact information and establish a determined communication with the target contact via the said wireless communication system.

Another possible usage context in this same example (FIG. 4) is that in which Mary 404 sends a message to John 403. In this case, Mary 404 sends a message (e.g., "I love you") via her smartphone 408 to John' smartphone 406. When John' smartphone 406 receives the "I love you" message from Mary' smartphone 408, it recognizes the sender (Mary 404) and can transmit a signal/command to all objects associated to the sender Mary 404 (for example, a portrait), in order to pre-configure the objects to automatically starts a communication with Mary 404 as soon as John 403 interacts with one of the objects. Additionally, these objects would provide a feedback signal (e.g., light sign through a blinking LED, sound sign through audio output, a visual sign on the display, etc.) according to the hardware capabilities of the objects associated to Mary. (In this case, it could be a kind of "redundant or expanding warning" of the Mary's message receipt, since John' smartphone 406 probably have means to warn Mary's message receipt). Maybe John does not immediately realize that his smartphone 406 received an incoming message (for instance, the smartphone 406 is in silent mode and out of John's field of view). But when John 403 realizes (see, listen, feel) the feedback signal from any object associated to Mary 404, John 403 will be aware that Mary has established a communication with him (and could reply the communication by interacting with the object or via his smartphone 406).

Figure 5:
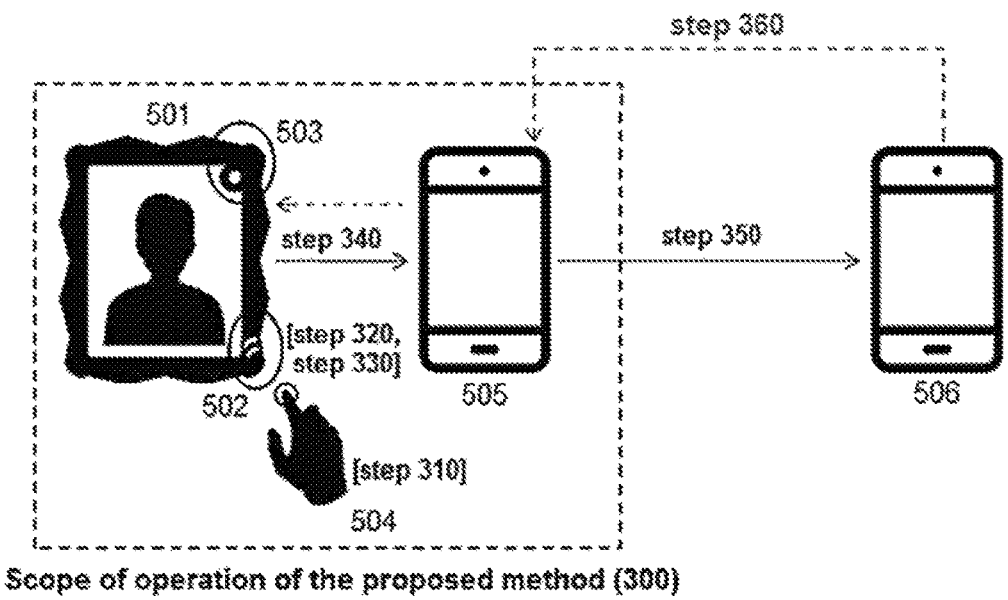
FIG. 5 illustrates an embodiment of the method of the present invention using a capacitive touch hardware.

FIG. 5 shows an embodiment with a touch capacitive hardware. Differently from the previous example (FIG. 4), in this case the type of interaction is the user touching the object (a tag, or a capacitive sensor that is able to identify the user touch). In the present example, there is an object (e.g., a portrait) 501 which contain an electronic hardware therein (for example, a capacitive sensor 502 and a signaling LED light 503). The interaction of the user 504 with the portrait sensor 502 [corresponds to step 310 of the proposed method] is identified by the hardware's capacitive sensor [corresponds to step 320 of the proposed method]. Since the portrait 501 is paired with the smartphone 505, through the user interaction the information of target contact and data is sent via RF communication to smartphone 505 [corresponds to step 340 of the proposed method]. In this case, the default action is to send a standard preset message [step 330], but alternatively, the user could send another kind of message using the smartphone 505 [step 330] (e.g., record an audio/voice message). Automatically (by the identification of the contact—step 320), smartphone 505 starts the communication with the smartphone 506 of the target contact [corresponds to step 350 of the proposed method]. If the portrait 501 has own system communication (to directly communicate with target contact) [step 338], it directly sends a standard message to the target contact [step 350], without the necessity to pair with the smartphone 505 [as described in step 340].

Via smartphone 506, the target contact can reply the communication/message to smartphone 505 [corresponds to step 360 of the proposed method], and smartphone 505 could send (via RF) a signal to the hardware of portrait 501, alerting by LED light 503 that there is a new message or feedback communication from the target contact 506. The dashed line area represents the "main scope of operation" (steps 310 to 350) of the proposed method 300.

Figure 6:
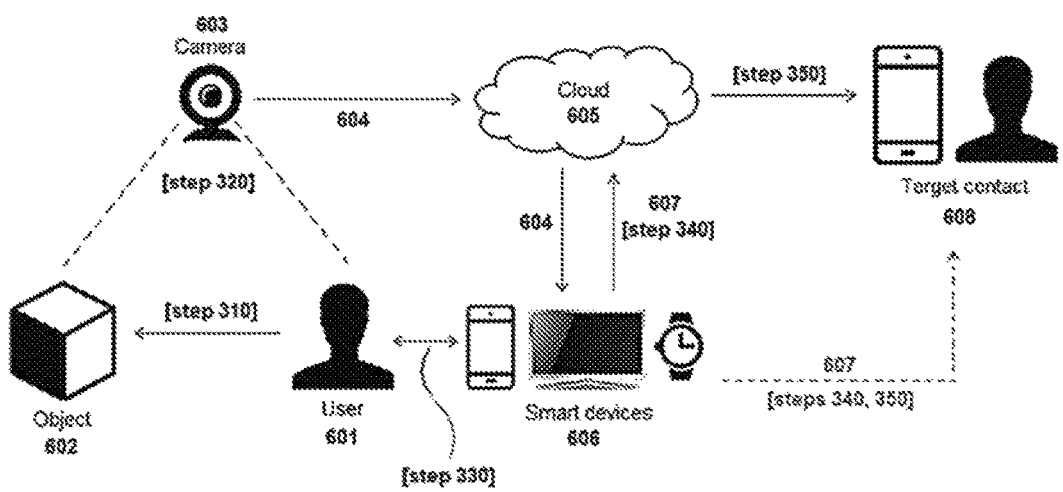
FIG. 6 illustrates an embodiment of the method of the present invention using a video camera and scene/image recognition.

FIG. 6 shows an embodiment with a video camera for image/action recognition. Differently from the previous examples (FIGS. 4 and 5), in this case the interaction is identified by image/action/scene recognition (e.g., a camera captures a determined interaction of the user with the object). In this case, the user does not need to touch the object tag/sensor (because the identification/recognition is performed by the camera); additionally, the object does not need to have a specific hardware (tag/sensor). When the user 601 interacts with a specific object 602 [corresponds to step 310 of the proposed method], a camera 603 captures the scene and, by image/scene recognition, identifies the interaction between users 601 and object 602 [corresponds to step 320 of the proposed method]. Identified the interaction, the camera 603 connects and sends the data 604 of scene/image recognition to the cloud 605 (e.g. a server on the Internet). The cloud 605 receives this data 604 (which identifies the interaction) and send a plurality of suggested actions (according to the previously identified interaction) to one or more smart device 606 of the user 601. Then the user 601 can decide which suggested action to choose (e.g., an audio record, a standard message, SMS, STT, TTS) [corresponds to step 330 of the proposed method]. The smart device 606 sends the action/message 607 to the cloud 605 [corresponds to step 340 of the proposed method], which then redirects the action/message to the target contact 608 [corresponds to step 350 of the proposed method]. Alternatively, the user smart device 606 can directly establish a digital connection with the target contact 608 sending the user's action/message 608.

Figure 7:
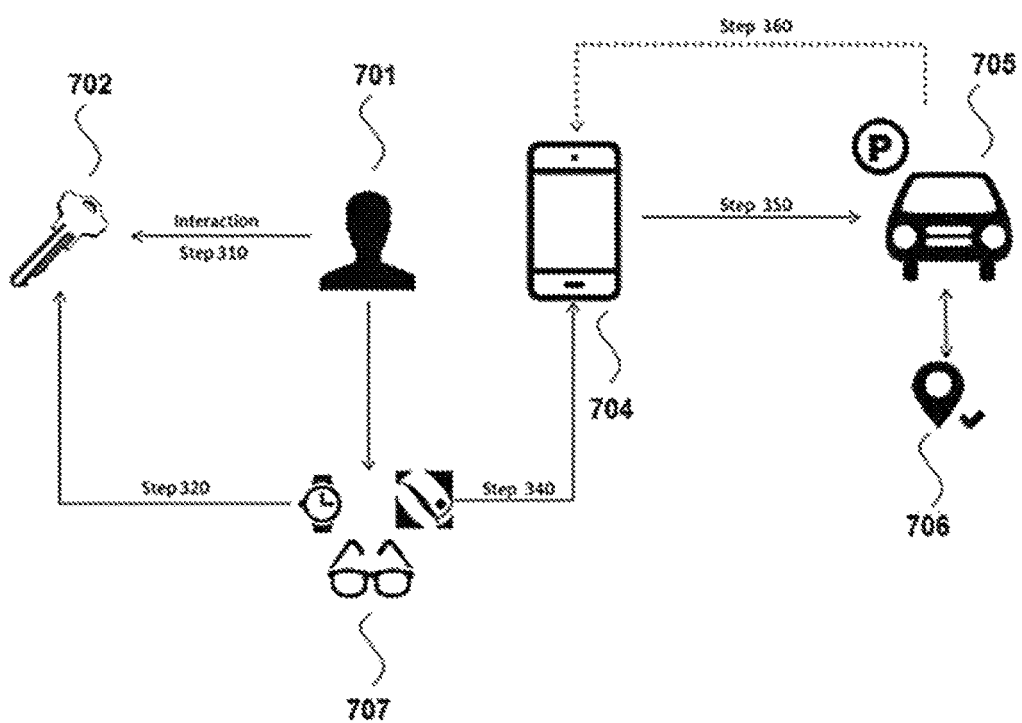
FIG. 7 illustrates an embodiment of the method of the present invention using a machine connection.

FIG. 7 shows an embodiment with interaction recognition from the user with a machine, in this specific example a car. This is a different type of communication (user-machine), when compared to the previous examples (FIGS. 4 to 6, first user-target user/person communication). The user 701 interacts with an object 702, in this case, a car key [corresponds to step 310 of the proposed method]. For example, the interaction could be identified by the user 701 touching a capacitive portion/sensor of the car key 702, or approximating the car key 702 to his/her (701) wearable device 707 via NFC reader which identifies a NFC tag in the car key 702, among many other possibilities (already illustrated in the previous examples of FIGS. 4 to 6). Since the interaction was detected/identified, information from the object 702 is extracted [corresponds to step 320 of the proposed method]. This information is sent via RF communication to the smartphone 704 [corresponds to step 340 of the proposed method]. The Smartphone 704 sends information/action/request to the car 705, for example asking the car's location 706 [corresponds to step 350 of the proposed method]. The car provides (for instance) its GPS location to the Smartphone 704 [corresponds to step 360 of the proposed method]. This information can be received in the Smartphone 704 or wearable device 707. In this example, the car 705 must have possibilities to communicate via wireless with devices.

One person skilled in the art will recognize there may be many variations, modifications and alternatives. For example, the machine described in figure may not necessarily be a car, it might be any machine/device with sensors (to provide information, operation status, etc.) and capability to wireless communication (e.g.: NFC, Bluetooth, Wi-Fi, Zigbee, etc.), e.g., smart appliances. In fact, although the present invention has been described in connection with certain preferred embodiments, it should be understood that it is not intended to limit the invention to those particular embodiments. Rather, it is intended to cover all alternatives, modifications and equivalents possible within the spirit and scope of the invention as defined by the appended claims.

Although the present invention has been described in connection with certain preferred embodiment, it should be understood that it is not intended to limit the invention to those particular embodiment. Rather, it is intended to cover all alternatives, modifications and equivalents possible within the spirit and scope of the invention as defined by the appended claims.

The invention claimed is:

1. A method for communication between electronic devices, the method comprising:
    detecting an interaction of a user with an object;
    identifying associated data, contact information, and characteristics of the object;
    displaying a plurality of actions and messages to the user according to the interaction of the user with the object based on at least one of the associated data and the characteristics of the object;
    receiving a selection by the user of at least one of the plurality of actions and messages associated with the object;
    determining whether the object has a communication resource;
    providing instructions, based on the determining, to at least one of the object and a smart device of the user to automatically communicate the selected at least one of the plurality of actions and messages with a smart device of a target contact based on the contact information; and
    checking whether a response from the smart device of the target contact has been received,
    wherein the selected at least one of the plurality of actions and messages associated with the object includes at least one of a voice/video call, audio recording, talk to text, default message, text to speech, virtual assistance, and SMS.

2. The method according to claim 1, wherein the checking further comprises allowing a new selection by the user of the plurality of actions and messages, thereby maintaining the communication.

3. The method according to claim 1, wherein the user interaction is detected by a user wearable device with a dedicated program for recognizing at least one of a Near Field Communication reader smart tag, bar code, infrared, Bluetooth, camera, electro vibration, ultrasonic vibration, and position of the user wearable device.

4. The method according to claim 1, wherein the detecting is performed by an image recognition system detecting a predefined movement by the user with the object, and a cloud system (605) processes data (604) and information and provides a response to the smart devices of the user (606).

5. The method according to claim 1, wherein the detecting the interaction is performed by a wearable device including a program, a battery, a processor to execute the program, a wireless communication system, hardware to detect the interaction with the object, and a memory to store the program.

6. The method according to claim 1, wherein the target contact comprises at least one of another user, group of users, web service, a computer system, and a machine.

7. The method according to claim 1, wherein the checking further comprises sending, to the smart device of the target contact, instructions to at least one object associated with the smart device of the target contact, and receiving a feedback signal from the at least one object associated with the smart device of the target contact.

8. The method according to claim 1, wherein the detecting the interaction of the user with the object is performed using a camera.

9. The method according to claim 8, wherein the identifying further includes sending image recognition data captured by the camera to a server to perform the identifying.

10. A non-transitory computer-readable recording medium storing a program to implement a method comprising:
    detecting, by at least one processor of an apparatus, an interaction of a user with an object;
    identifying, by the at least one processor of the apparatus, associated data, contact information, and characteristics of the object;
    displaying, by the at least one processor of the apparatus, a plurality of actions and messages to the user according to the interaction of the user with the object based on at least one of the associated data and the characteristics of the object;
    receiving, by the at least one processor of the apparatus, a selection by the user of at least one of the plurality of actions and messages associated with the object;
    determining, by the at least one processor of the apparatus, whether the object has a communication resource;
    providing, by the at least one processor of the apparatus, instructions, based on the determining, to at least one of the object and a smart device of the user to automatically communicate the selected at least one of the plurality of actions and messages with a smart device of a target contact based on the contact information; and
    checking, by the at least one processor of the apparatus, whether a response from the smart device of the target contact has been received,
    wherein the selected at least one of the plurality of actions and messages associated with the object includes at least one of a voice/video call, audio recording, talk to text, default message, text to speech, virtual assistance, and SMS.

11. An apparatus comprising:

at least one memory configured to store instructions; and at least one processor configured to execute the stored instructions to implement a method comprising:

detecting, by the at least one processor of the apparatus, an interaction of a user with an object;

identifying, by the at least one processor of the apparatus, associated data, contact information, and characteristics of the object;

displaying, by the at least one processor of the apparatus, a plurality of actions and messages to the user according to the interaction of the user with the object based on at least one of the associated data and the characteristics of the object;

receiving, by the at least one processor of the apparatus, a selection by the user of at least one of the plurality of actions and messages associated with the object;

determining, by the at least one processor of the apparatus, whether the object has a communication resource;

providing, by the at least one processor of the apparatus, instructions, based on the determining, to at least one of the object and a smart device of the user to automatically communicate the selected at least one of the plurality of actions and messages with a smart device of a target contact based on the contact information; and checking, by the at least one processor of the apparatus, whether a response from the smart device of the target contact has been received, wherein the selected at least one of the plurality of actions and messages associated with the object includes at least one of a voice/video call, audio recording, talk to text, default message, text to speech, virtual assistance, and SMS.

\* \* \* \* \*